(12) United States Patent
Sobel et al.

(10) Patent No.: US 8,762,980 B1
(45) Date of Patent: Jun. 24, 2014

(54) ROLLING INCREMENTAL UPDATES

(75) Inventors: William E. Sobel, Jamul, CA (US); James Brennan, Rancho Palos Verdes, CA (US)

(73) Assignee: Symantec Corporation, Mountain View, CA (US)

( * ) Notice: Subject to any disclaimer, the term of this patent is extended or adjusted under 35 U.S.C. 154(b) by 452 days.

(21) Appl. No.: 12/878,913

(22) Filed: Sep. 9, 2010

(51) Int. Cl.
*G06F 9/44* (2006.01)
*G06F 9/445* (2006.01)
*G06F 3/12* (2006.01)

(52) U.S. Cl.
CPC .. *G06F 8/68* (2013.01); *G06F 8/65* (2013.01); *G06F 8/66* (2013.01); *G06F 8/665* (2013.01); *G06F 8/70* (2013.01); *G06F 8/71* (2013.01); *G06F 3/123* (2013.01); *G06F 3/1225* (2013.01)
USPC ........... 717/170; 717/168; 717/169; 717/171; 717/172; 717/173

(58) Field of Classification Search
CPC .............. G06F 8/65; G06F 8/66; G06F 8/68; G06F 8/665; G06F 8/70; G06F 8/71; G06F 3/123; G06F 3/1225
USPC ...................... 717/168–173; 714/13; 713/187; 709/242
See application file for complete search history.

(56) References Cited

U.S. PATENT DOCUMENTS

| | | | |
|---|---|---|---|
| 5,832,520 A * | 11/1998 | Miller | 1/1 |
| 6,052,531 A * | 4/2000 | Waldin et al. | 717/170 |
| 6,546,552 B1 * | 4/2003 | Peleg | 717/170 |
| 6,651,249 B2 * | 11/2003 | Waldin et al. | 717/170 |
| 7,260,818 B1 * | 8/2007 | Iterum et al. | 717/170 |
| 7,600,225 B2 * | 10/2009 | Sliger et al. | 717/169 |
| 7,779,401 B2 * | 8/2010 | Scian et al. | 717/168 |
| 7,860,834 B2 * | 12/2010 | Meller et al. | 707/638 |
| 7,975,264 B2 * | 7/2011 | Sriram et al. | 717/169 |
| 8,015,267 B2 * | 9/2011 | Patel | 709/220 |
| 8,055,096 B2 * | 11/2011 | Dahms et al. | 382/282 |
| 8,065,672 B2 * | 11/2011 | Sriram et al. | 717/169 |
| 2004/0068724 A1 * | 4/2004 | Gardner et al. | 717/173 |
| 2005/0022175 A1 * | 1/2005 | Sliger et al. | 717/169 |
| 2006/0112152 A1 * | 5/2006 | Napier et al. | 707/203 |
| 2007/0300205 A1 * | 12/2007 | Scian et al. | 717/106 |

(Continued)

OTHER PUBLICATIONS

Incremental Updating and Versioning—Antony Cooper, icomtek, CSIR, PO Box 395 Pretoria, 0001, South Africa—Ammatzia Peled, Department of Geography, University of Haifa, Haifa, 31905, Israel—2001.*

*Primary Examiner* — Lewis A Bullock, Jr.
*Assistant Examiner* — Francisco Aponte
(74) *Attorney, Agent, or Firm* — Brill Law Office; Jeffrey Brill

(57) ABSTRACT

Multiple versions of a sequential dataset are maintained without storing the full file set for each version. A full file set for the current version is stored, as well as a chain of forward and/or reverse patches between adjacent versions. New content for the dataset is received, and a new current version is built that includes this new content. Patches between the new and immediately previous versions are built and stored. When a request is received from a client for an update to the current version, multiple patches of the chain are merged, from the client version of the dataset to the current version. This merging of patches creates a single direct delta, which comprises all operations for updating the client version to the current version. The direct delta is then transmitted to the client.

18 Claims, 4 Drawing Sheets

(56) References Cited

U.S. PATENT DOCUMENTS

| | | | |
|---|---|---|---|
| 2008/0178168 A1* | 7/2008 | Sriram et al. | 717/169 |
| 2008/0301668 A1* | 12/2008 | Zachmann | 717/173 |
| 2009/0183150 A1* | 7/2009 | Felts | 717/173 |
| 2010/0281458 A1* | 11/2010 | Paladino et al. | 717/106 |
| 2010/0306756 A1* | 12/2010 | Scian et al. | 717/168 |
| 2011/0302570 A1* | 12/2011 | Kurimilla et al. | 717/170 |

* cited by examiner

ROLLING INCREMENTAL UPDATES

TECHNICAL FIELD

This disclosure pertains generally to managing sequential datasets, and more specifically to providing direct deltas between the current and other versions of a sequential dataset without storing the full file set for each version.

BACKGROUND

In some instances servers store multiple versions of a sequential dataset, such that they can provide current, earlier and/or later versions of the sequential dataset to clients. A sequential dataset comprises a set of data that changes over time as content is modified, added or deleted. Each time content changes, most of the data in the set remains the same, but some portion is updated. For example, think of a server managed by a publisher of security software storing malicious code definitions. Because new malicious code definitions are added frequently as new malware is identified, the current set of malicious code definitions is frequently changing. To provide an updated dataset to a client (i.e., in this case the current set of malicious code definitions where the client has an earlier, non-current set), such servers conventionally generate a direct delta between the target set (e.g., the current version of the malicious code signature set) and the version of the dataset currently stored locally by the given client. The server then provides the delta over the network to the client computer. However, in case of an error or problem with the update, it is important that the client be able to restore an earlier version of the sequential data that was known to work reliably. Thus, the server conventionally caches the full file set of each version of the sequential data it needs to make available to a given client. However, full file sets can be quite large. This means that for each version of a typical set of malicious code definitions cached by the server, a large amount of storage space is used. Depending upon the nature of the business, a customer might have 1 to 20 GB of server space for caching definition sets. However, considering the large size of the full data sets, this gives the customer only enough space to store direct delta coverage for a short time (e.g., one to ten days or so). Customers of security software would typically like to have more coverage. This matters to customers because distributing full, malicious code definitions to each node within their organization can saturate their network and effect business operations. Therefore, it is important to be able to distribute deltas rather than full definition sets, even when the nodes within the organization have not been updated recently (e.g., because of a holiday). It would be desirable to be able to provide customers with 45 days of direct delta coverage, by default, in order to support 30 day European holidays. With conventional technology, however, the space consumption is well beyond reasonable. It would be desirable to address these issues.

SUMMARY

A rolling incremental update system provides clients with direct deltas between the current and other versions of a sequential dataset without storing a full file set for each version. More specifically, multiple versions of the sequential dataset are maintained without storing the full file set for each version. A full file set for one version of the sequential dataset is stored, typically the current version. Also stored is a chain of forward patches between adjacent versions of the sequential dataset, the chain spanning from a first version of the sequential dataset to the current version of the sequential dataset. Each forward patch comprises information for performing operations to modify a specific earlier version of the sequential dataset into the adjacent, later version. Instead of or in addition to the forward patches, the stored chain can also include reverse patches between adjacent versions of the dataset, spanning from the current version of the dataset to the first version of the dataset. Each reverse patch comprises information for performing operations to modify a specific later version of the sequential dataset into the adjacent, earlier version.

New content for the sequential dataset is received, for example by being downloaded in the form of delta or content files. A new current version of the sequential dataset is built that includes the new content. To do so, the stored full file set of the current version of the sequential dataset and the downloaded new content are used to construct a full file set of the new version of the sequential dataset that includes the new content. This full file set of the new version of the sequential data set is stored, the current version of the sequential dataset is reclassified as the immediately previous version, and the new version of the sequential dataset is reclassified as the current version. A forward patch from the immediately previous version of the sequential dataset to the current version and/or a reverse patch from the current version of the sequential dataset to the immediately previous version are built and stored in the patch chain. The full file set of the immediately previous version of the sequential data set is then deleted.

When a request is received from a client for an update to the current version of the sequential dataset, multiple patches of the patch chain are merged, from the client version of the sequential dataset to the current version. This merging of patches, which can be in the form of a serious of union operations, creates a single direct delta, which comprises all operations for updating the client version of the sequential dataset to the current version. The direct delta is then transmitted to the client so that the client can perform the version update.

In some instances, a request can be received from a client to associate a name with a specific version of the sequential dataset. In this case, the name is associated with the specific version of the dataset for the specific client, thereby naming the specific version. If a request from the client to revert to a named version of the sequential dataset previous to the current version is received, multiple patches of the patch chain from the current version of the sequential dataset back to the named version are merged. This merging of patches creates a single direct delta comprising all operations for reverting the current version of the sequential dataset back to the named version of the sequential data set. The direct delta is then transmitted to the client so that the client can perform the reversion.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
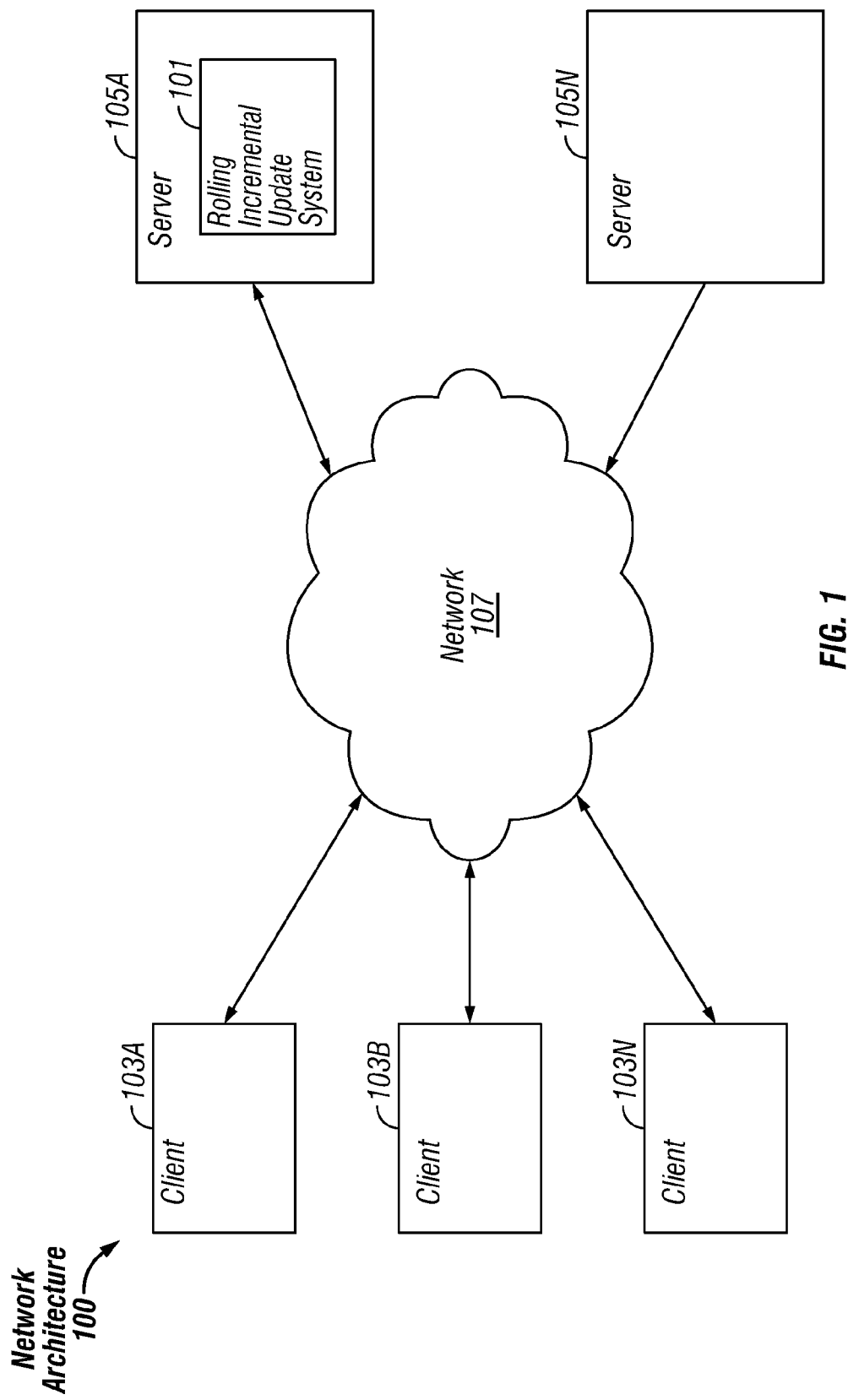
FIG. 1 is a block diagram of an exemplary network architecture in which a rolling incremental update system can be implemented, according to some embodiments.

FIG. 1 is a block diagram illustrating an exemplary network architecture 100 in which a rolling incremental update system 101 can be implemented. The illustrated network architecture 100 comprises multiple clients 103A, 103B and 103N, as well as multiple servers 105A and 105N. In FIG. 1, the rolling incremental update system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
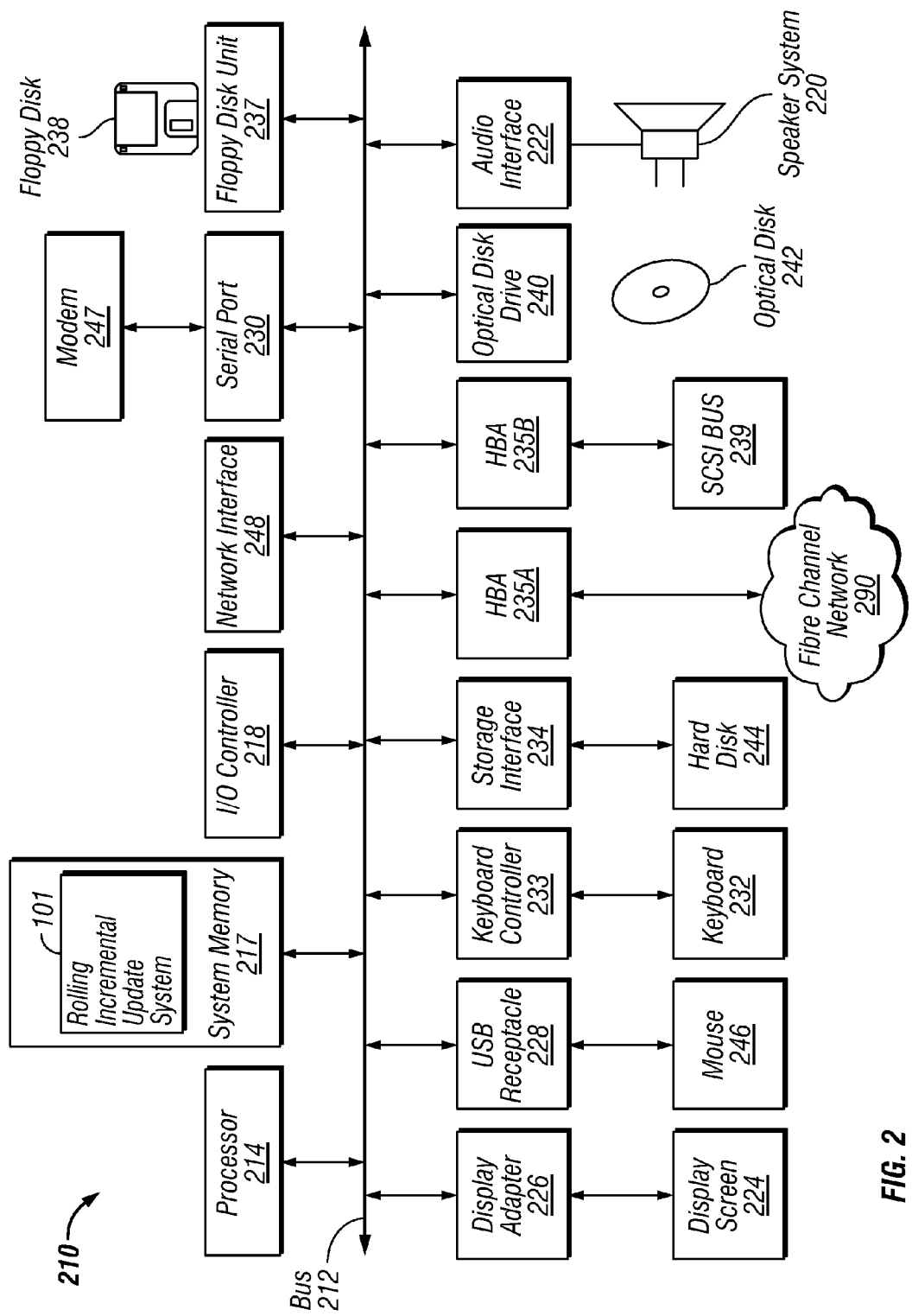
FIG. 2 is a block diagram of a computer system suitable for implementing a rolling incremental update system, according to some embodiments.

FIG. 2 is a block diagram of a computer system 210 suitable for implementing a rolling incremental update system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the rolling incremental update system 101 is illustrated as residing in system memory 217. The workings of the rolling incremental update system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
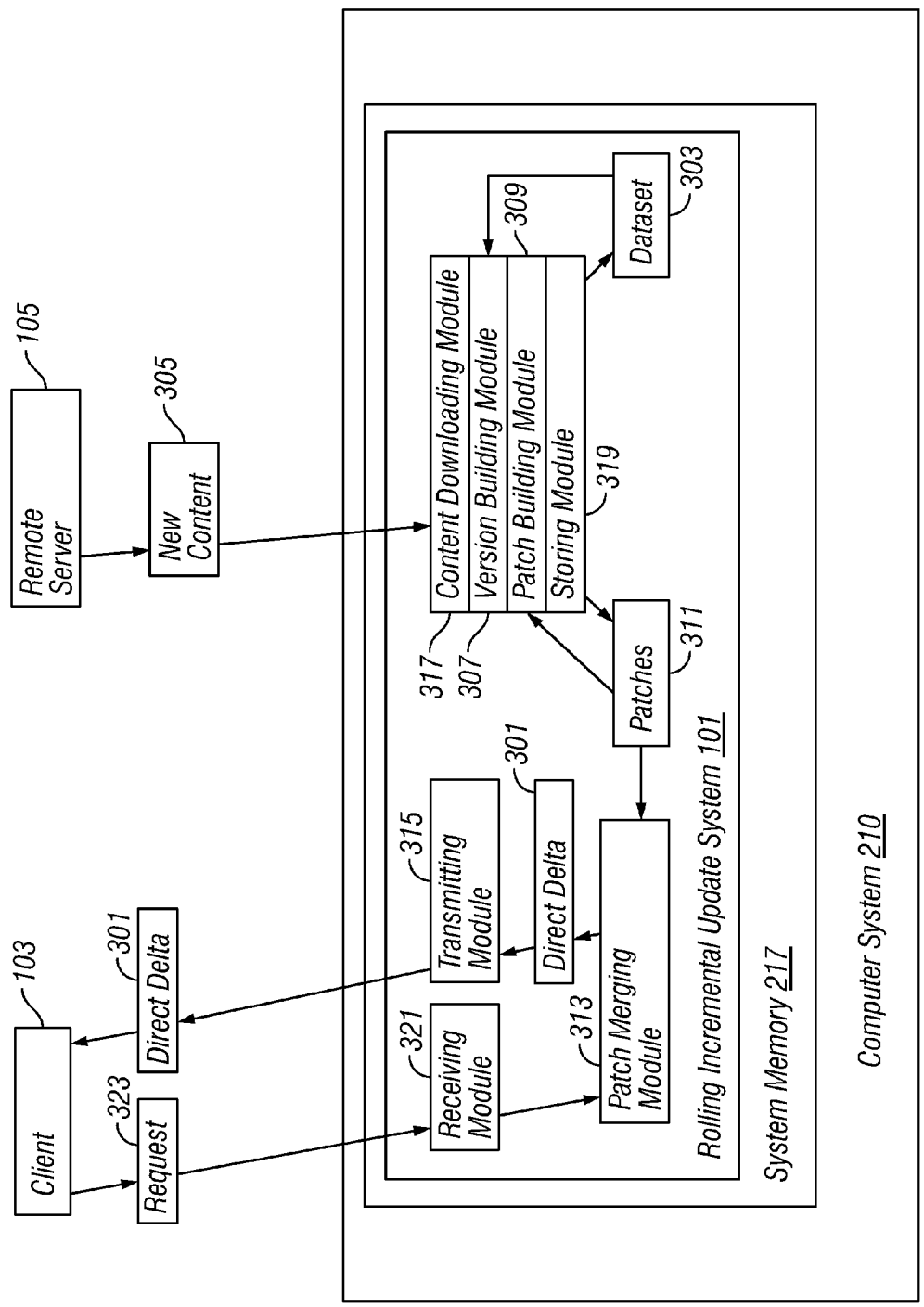
FIG. 3 is a block diagram of the operation of a rolling incremental update system, according to some embodiments.

FIG. 3 illustrates the operation of a rolling incremental update system 101, residing in the system memory 217 of a computer system 210 according to some embodiments. As described above, the functionalities of the rolling incremental update system 101 can reside on a client 103, a server 105, or be distributed between multiple computer systems 210, including within a cloud-based computing environment in which the functionality of the rolling incremental update system 101 is provided as a service over a network 107. It is to be understood that although the rolling incremental update system 101 is illustrated in FIG. 3 as a single entity, the illustrated rolling incremental update system 101 represents a collection of functionalities, which can be instantiated as a single or multiple modules as desired (an instantiation of specific, multiple modules of the rolling incremental update system 101 is illustrated in FIG. 3). It is to be understood that the modules of the rolling incremental update system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the rolling incremental update system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the rolling incremental update system 101 provides direct deltas 301 between the current version of a sequential dataset 303 and different versions of the sequential dataset 303 on client computers 103 (one client 103 is illustrated for clarity but in practice many would likely be deployed) without storing the full file set for each version, and without storing the full file sets of old versions. To do so, whenever new content 305 that is part of the dataset 303 becomes available to the rolling incremental update system 101, a version building module 307 of the rolling incremental update system 101 builds a new (current) version of the sequential dataset 303 that includes the new content 305. For example, in the case of malicious code definitions, whenever a new malicious code definition becomes available, the version building module 307 builds a current version of the malicious code definition set that includes the new definition. In order to build a new version of the dataset 303, a patch building module 309 of the rolling incremental update system 101 typically builds a forward patch 311 from the previous version of dataset 303 (i.e., the version that was current prior to the receipt of the new content 305) to the current version (the version with the new content 305). In some embodiments, the patch building module 309 builds a reverse patch 311 from the current version back to the previous version in addition to or instead of the forward patch 311. These patches 311 comprise information for performing the operations to modify one version of a sequential dataset 303 into another version (this can be called a delta, a diff or a differencing file). It is to be understood that a patch 311 can be in any format suitable for the purpose (e.g., machine readable, human readable, script, batch file, etc.), and different formats can be used in different embodiments.

As new content 305 (e.g., malicious code definitions) becomes available over time, the version building module 307 builds new versions of the dataset 303. For each new version, the patch building module 309 builds a patch 311 from the previous version forward to the new version, and/or from the new version back to the previous version. Noting that each previous version was once the current version, there will be patches 311 connecting each version in the chain from the first version of the dataset 303 to the most recent, current version. In an embodiment in which both forward and reverse patches 311 are maintained, each version that is not the beginning or end of the chain will be connected both forward and backwards, to the previous and subsequent version. This collection or chain of patches 311 can be instantiated in the form of a doubly linked list. Where only forward patches 311 spanning the versions from first to the most recent or reverse patches 311 spanning the versions from the most recent to the first are maintained, a singly linked list can be used for this purpose.

To update a client 103 from any version of the sequential dataset 303 to any other, a patch merging module 313 of the rolling incremental update system 101 merges all of the patches 311 between those versions, creating a union of their content. For example, suppose the sequential dataset 303 consists of versions one (the first version) through 100 (the current version), and a given client has version 86 and wishes to update to the current version. The patch merging module 313 will merge the patch 311 from version 86 to version 87 with the patch 311 from version 87 to version 88, and so on, all the way to the patch 311 from versions 99 to 100. During merging, when content between multiple patches 311 overlaps, the newest content is preserved in the union (expect when reverting from a more recent version to a previous version, in which case the oldest content is kept). This merging operation results in a single, direct delta 301 that contains all of the operations required to update from the client's version of the sequential dataset 303 to the target version. A transmitting module 315 of the rolling incremental update system 101 can then transit this direct delta 301 to the client 103, which can use it to update its version of the sequential dataset 303 to the current version.

One may be concerned that the direct delta file 301 would become very large, or would be time or computing resource expensive to create. However, experience and research has shown that direct delta files 301 spanning multiple versions of a dataset 303 are similar in size to deltas between adjacent versions created by conventional systems. Also the union operation itself is fast, given that it is operating on the already small patches 311 between versions, and not large data files.

Describing the updating of clients 103 in greater detail consider the following scenario. A client has version A of the sequential dataset 303. The client 103 has been offline for a number of revisions, and the rolling incremental update system 101 now considers version D to be the current one. In this embodiment, both forward and reverse patches 311 are maintained, so the rolling incremental update system 101 has patches 311 from A to B, B to A, B to C, C to B, C to D and D to C. A request receiving module 321 of the rolling incremental update system 101 receives a request 323 from the client 103 for an update to the current version, the request 323 noting that the client has version A. The patch merging module 313 of the rolling incremental update system 101 dynamically constructs a direct delta 301 for A to D by merging the appropriate, existing patches 311 (A to B, B to C and C to D). The transmitting module 315 transmits the direct delta 301 to the client 103, which applies it in order to update to version D.

In order to maintain the chain of patches 311 covering each version of the sequential dataset 303 as new versions occur, a storing module 319 of the rolling incremental update system 101 typically stores just one full version of the dataset 303, the current version. By storing the full, current version of the dataset 303, the rolling incremental update system 101 can provide the current version (e.g., in the form of a zip file) to clients 103 that have no version of the dataset 303, or that have a version that is so old as to be outside of the versions supported by the patch chain.

As noted above, the rolling incremental update system 101 receives new content 305 that is part of the dataset 303 over time, as it becomes available. More specifically, a content downloading module 317 of the rolling incremental update system 101 downloads new content 305 over the network 105 from one or more external sources (e.g., a remote server 105 as illustrated) to update the rolling incremental update system 101. New content 305 can be in the form of new files (e.g., in the case of malicious code definitions, actual new definition files) and/or delta files (e.g., files containing changes to make to existing malicious code definitions files). For example, suppose the rolling incremental update system 101 has version D of the dataset 303, which it considers current prior to downloading a new version. Version E is the new version, now available for download. The content downloading module 317 downloads version E in the form of delta files or full content files. The version building module 307 then uses the full or delta files to construct a full file set of version E, based on the full file set of version D and the new content 305. The storing module 319 stores full file set of version E. The patch building module 309 builds a forward patch 311 from version D to version E and a reverse patch 311 from version E to version D. The storing module 319 stores these patches 311 in the patch chain. The version building module 307 then deletes the full files of version D, which are no longer needed, as version E is now the current version.

It is to be noted that in some instances, clients 103 may not wish to use the current version of the dataset 303. In some embodiments, a client 103 can name a specific version by providing a name to give to a specific version of the dataset 303 to the rolling incremental update system 101. The rolling incremental update system 101 then associates the given name with that version of the dataset 303 for that client 103. In such a case, the client 103 can use one version for a specific group within the client organization and another version by the organization as a whole. This feature can be used by the client 103 to setup a test group to vet a version of the dataset 303 prior to distribution throughout the organization. For example, a client 103 could use a test group to test the current version from the rolling incremental update system 101, while the rest of the organization uses an earlier (named) version that has already been tested and found satisfactory. When the current version has been sufficiently tested without an issue, an administrator at the client 103 can distribute the current version organization wide. To recover from the distribution of a version that turns out to be problematic after the fact, the client 103 can request an earlier version (e.g., the named version) from the rolling incremental update system 101. For example, if the client 103 rolled out version E but wants to roll back to version C, the client 103 informs the rolling incremental update system 101 of this. The rolling incremental update system 101 then generates a backwards direct delta 301 from version E to version C as described above by merging the backwards patch 311 from E to D and the one from D to C. The transmitting module 315 transmits the direct delta 301 to the client 103, which can use it to restore earlier, known good version C throughout the organization. In some embodiments, the storing module 319 stores a full file set for client named versions of the dataset 303, but this is not necessary as the full file set of any version can be reconstructed from the patch chain.

Figure 4:
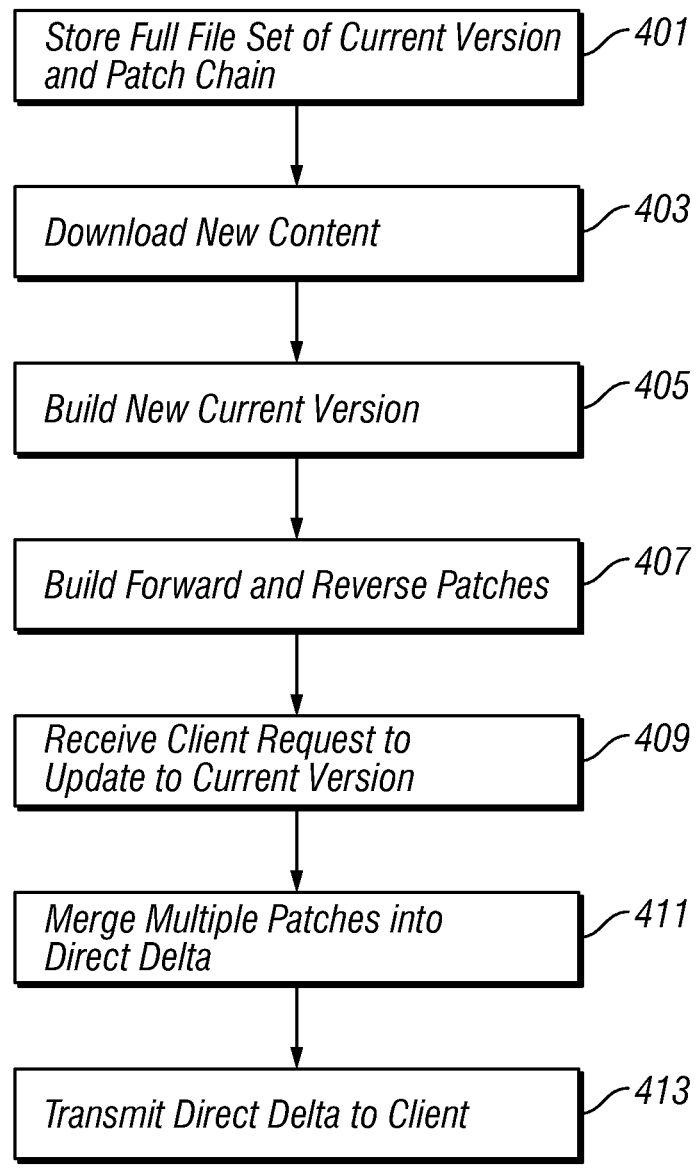
FIG. 4 is a flowchart of the operation of a rolling incremental update system, according to some embodiments.

FIG. 4 illustrates steps for the operation of a rolling incremental update system 101 (FIG. 1), according to some embodiments. The rolling incremental update system (FIG. 1) provides clients 103 (FIG. 1) with direct deltas 301 (FIG. 3) between the current and other versions of a sequential dataset 303 (FIG. 3) without storing a full file set for each version. The storing module 319 (FIG. 3) stores 401 a) the full file set for the current version of the sequential dataset 303 (FIG. 3) and b) a chain of forward patches 311 (FIG. 3) and/or reverse patches 311 (FIG. 3) between adjacent versions of the sequential dataset 303 (FIG. 3). The content downloading module 317 (FIG. 3) downloads 403 new content 305 (FIG. 3) for the sequential dataset 303 (FIG. 3). The version building module 307 (FIG. 3) builds 405 a new current version of the sequential dataset 303 (FIG. 3) that includes the new content 305 (FIG. 3). The patch building module 309 (FIG. 3) builds 407 a forward patch 311 (FIG. 3) and/or a reverse patch 311 (FIG. 3) between the new current version and the immediately previous version of the sequential dataset 303 (FIG. 3). The request receiving module 321 (FIG. 3) receives 409 a request from a client 103 (FIG. 1) to be updated to the current version of the sequential dataset 303 (FIG. 3). In response, the patch merging module 313 (FIG. 3) merges 411 multiple patches 311, from the client's version of the sequential dataset 303 (FIG. 3) to the current version. This merging results in a single direct delta 301 (FIG. 3) which comprises all operations for updating the client's version of the sequential dataset 303 (FIG. 3) to the current version. The transmitting module 315 (FIG. 3) transmits 413 the direct delta 301 (FIG. 3) to the client (FIG. 1), so that the client (FIG. 1) can perform the version update.

As will be understood by those familiar with the art, the invention may be embodied in other specific forms without departing from the spirit or essential characteristics thereof. Likewise, the particular naming and division of the portions, modules, agents, managers components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for providing direct deltas between the current and other versions of a sequential dataset without storing a full file set for each version, the method comprising the steps of:

maintaining, by at least one computer, multiple versions of the sequential dataset without storing the full file set for each version, said maintaining further comprising:

storing, by the at least one computer, the full file set for one version of the sequential dataset; and storing, by the at least one computer, at least one set of patches from a group of patch sets consisting of:

forward patches between adjacent versions of the sequential dataset in a patch chain, the patch chain spanning from a first version of the sequential dataset to the current version of the sequential dataset, each forward patch comprising information for performing operations to modify an earlier version of the sequential dataset into an adjacent, later version of the sequential dataset; and reverse patches between adjacent versions of the dataset in the patch chain, the patch chain spanning from the current version of the dataset to the first version of the dataset, each reverse patch comprising information for performing operations to modify a later version of the sequential dataset into an adjacent, earlier version of the sequential dataset;

receiving, by the at least one computer, new content for the sequential dataset;

building, by the at least one computer, a new current version of the sequential dataset that comprises the new content;

building, by the at least one computer, at least one specific patch from a group of specific patches consisting of:

a specific forward patch from an adjacent, previous version of the dataset to the new current version of sequential dataset, the specific forward patch comprising information for performing operations to modify the adjacent, previous version of the sequential dataset into the new current version of the sequential dataset; and a specific reverse patch from the new current version of the sequential dataset to an adjacent, previous version of the dataset, the specific reverse patch comprising information for performing operations to modify the new current version of the sequential dataset into the adjacent, previous version of the sequential dataset;

storing, by the at least one computer, the at least one specific built patch in the patch chain;
receiving, by the at least one computer, a request from a specific client to associate a provided name with a specific version of the sequential dataset; and
responsive to the received request, associating, by the at least one computer, the received name with the specific version of the dataset for the specific client, thereby naming the specific version of the sequential dataset according to the client request.

2. The method of claim 1 further comprising:
receiving, by the at least one computer, a request from a client for an update to the current version of the sequential dataset, the request identifying a client version of the sequential dataset;
merging, by the at least one computer, multiple patches of the patch chain from the client version of the sequential dataset to the current version of the sequential data set, said merging of patches creating a single direct delta, the direct delta comprising all operations for updating the client version of the sequential dataset to the current version of the sequential data set; and
transmitting, by the at least one computer, the direct delta to the client.

3. The method of claim 2 wherein merging, by the at least one computer, multiple patches of the patch chain further comprises:
creating, by the at least one computer, a union of the content of the multiple patches.

4. The method of claim 1 wherein receiving, by the at least one computer, new content for the sequential dataset further comprises downloading, by the at least one computer, the new content from at least one external source, and wherein storing, by the at least one computer, the full file set for one version of the sequential dataset further comprises storing the full file set of the current version of the sequential dataset, the method further comprising:
using the stored full file set of the current version of the sequential dataset and the downloaded new content to construct a full file set of a new version of the sequential dataset comprising the new content;
storing, by the at least one computer, the full file set of the new version of the sequential data set;
reclassifying, by the at least one computer, the current version of the sequential dataset as an immediately previous version of the sequential dataset;
reclassifying, by the at least one computer, the new version of the sequential dataset as the current version of the sequential dataset;
building, by the at least one computer, at least one specific patch from a group of specific patches consisting of:
a specific reverse patch from the current version of sequential dataset to the immediately previous version of the dataset, the specific forward patch comprising information for performing operations to modify the current version of the sequential dataset into the immediately previous version of the sequential dataset; and
a specific forward patch from the immediately previous version of the dataset to the current version of sequential dataset, the specific forward patch comprising information for performing operations to modify the immediately previous version of the sequential dataset into the current version of the sequential dataset;
storing, by the at least one computer, the at least one specific built patch in the patch chain; and
deleting, by the at least one computer, the full file set of the immediately previous version of the sequential data set.

5. The method of claim 4 wherein building, by the at least one computer, the at least one specific patch from a group of specific patches further comprises:
building, by the at least one computer, both patches from the group of specific patches.

6. The method of claim 1 wherein:
said maintaining, by the least one computer, multiple versions of the sequential dataset without storing the full file set for each version further comprises storing, by the at least one computer, both sets of patches from the group of patch sets; and wherein building, by the at least one computer, at least one specific patch from a group of specific patches further comprises:
building, by the at least one computer, both patches from the group of specific patches.

7. The method of claim 1 further comprising:
receiving, by the at least one computer, a request from the specific client to revert to a named version of the sequential dataset, wherein the named version of the sequential dataset is a version previous to the current version;
merging, by the at least one computer, multiple patches of the patch chain from the current version of the sequential dataset back to the named version of the sequential data set, said merging of patches creating a single direct delta, the single direct delta comprising all operations for reverting the current version of the sequential dataset back to the named version of the sequential data set; and
transmitting, by the at least one computer, the direct delta to the client.

8. The method of claim 1 further comprising:
building and storing, by the at least one computer, a full file set of the named version of the sequential data set.

9. At least one non-transitory computer readable storage medium storing a computer program product for providing direct deltas between the current and other versions of a sequential dataset without storing a full file set for each version, the computer program product comprising:
program code for maintaining multiple versions of the sequential dataset without storing the full file set for each version, said program code for maintaining further comprising:
program code for storing the full file set for one version of the sequential dataset; and
program code for storing at least one set of patches from a group of patch sets consisting of:
forward patches between adjacent versions of the sequential dataset in a patch chain, the patch chain spanning from a first version of the sequential dataset to the current version of the sequential dataset, each forward patch comprising information for performing operations to modify an earlier version of the sequential dataset into an adjacent, later version of the sequential dataset; and
reverse patches between adjacent versions of the dataset in the patch chain, the patch chain spanning from the current version of the dataset to the first version of the dataset, each reverse patch comprising information for performing operations to modify a later version of the sequential dataset into an adjacent, earlier version of the sequential dataset;
program code for receiving new content for the sequential dataset;
program code for building a new current version of the sequential dataset that comprises the new content;
program code for building at least one specific patch from a group of specific patches consisting of:
a specific forward patch from an adjacent, previous version of the dataset to the new current version of sequential dataset, the specific forward patch comprising information for performing operations to modify the adjacent, previous version of the sequential dataset into the new current version of the sequential dataset; and a specific reverse patch from the new current version of the sequential dataset to an adjacent, previous version of the dataset, the specific reverse patch comprising information for performing operations to modify the new current version of the sequential dataset into the adjacent, previous version of the sequential dataset;

program code for storing the at least one specific built patch in the patch chain;

program code for receiving a request from a specific client to associate a provided name with a specific version of the sequential dataset; and program code for, responsive to the received request, associating the received name with the specific version of the dataset for the specific client, thereby naming the specific version of the sequential dataset according to the client request.

10. The computer program product of claim 9 further comprising:

program code for receiving a request from a client for an update to the current version of the sequential dataset, the request identifying a client version of the sequential dataset;

program code for merging multiple patches of the patch chain from the client version of the sequential dataset to the current version of the sequential data set, said merging of patches creating a single direct delta, the direct delta comprising all operations for updating the client version of the sequential dataset to the current version of the sequential data set; and program code for transmitting the direct delta to the client.

11. The computer program product of claim 10 wherein the program code for merging multiple patches of the patch chain further comprises:

program code for creating a union of the content of the multiple patches.

12. The computer program product of claim 9 wherein the program code for receiving new content for the sequential dataset further comprises program code for downloading the new content from at least one external source, and wherein the program code for storing the full file set for one version of the sequential dataset further comprises program code for storing the full file set of the current version of the sequential dataset, the computer program product further comprising:

program code for using the stored full file set of the current version of the sequential dataset and the downloaded new content to construct a full file set of a new version of the sequential dataset comprising the new content;

program code for storing the full file set of the new version of the sequential data set;

program code for reclassifying the current version of the sequential dataset as an immediately previous version of the sequential dataset;

program code for reclassifying the new version of the sequential dataset as the current version of the sequential dataset;

program code for building at least one specific patch from a group of specific patches consisting of:

a specific reverse patch from the current version of sequential dataset to the immediately previous version of the dataset, the specific forward patch comprising information for performing operations to modify the current version of the sequential dataset into the immediately previous version of the sequential dataset; and a specific forward patch from the immediately previous version of the dataset to the current version of sequential dataset, the specific forward patch comprising information for performing operations to modify the immediately previous version of the sequential dataset into the current version of the sequential dataset;

program code for storing the at least one specific built patch in the patch chain; and program code for deleting the full file set of the immediately previous version of the sequential data set.

13. The computer program product of claim 12 wherein the program code for building the at least one specific patch from a group of specific patches further comprises:

program code for building both patches from the group of specific patches.

14. The computer program product of claim 9 wherein:

the program code for maintaining multiple versions of the sequential dataset without storing the full file set for each version further comprises program code for storing both sets of patches from the group of patch sets; and; wherein the program code for building at least one specific patch from a group of specific patches further comprises:

program code for building both patches from the group of specific patches.

15. The computer program product of claim 9 further comprising:

program code for receiving a request from the specific client to revert to a named version of the sequential dataset, wherein the named version of the sequential dataset is a version previous to the current version;

program code for merging multiple patches of the patch chain from the current version of the sequential dataset back to the named version of the sequential data set, said merging of patches creating a single direct delta, the single direct delta comprising all operations for reverting the current version of the sequential dataset back to the named version of the sequential data set; and program code for transmitting the direct delta to the client.

16. The computer program product of claim 9 further comprising:

program code for building and storing a full file set of the named version of the sequential data set.

17. A computer system for providing direct deltas between the current and other versions of a sequential dataset without storing a full file set for each version, the computer system comprising:

at least one processor;

system memory;

a portion configured for maintaining multiple versions of the sequential dataset without storing the full file set for each version, said portion configured for maintaining further comprising:

a portion configured for storing the full file set for one version of the sequential dataset; and a portion configured for storing at least one set of patches from a group of patch sets consisting of:

forward patches between adjacent versions of the sequential dataset in a patch chain, the patch chain spanning from a first version of the sequential dataset to the current version of the sequential dataset, each forward patch comprising information for performing operations to modify an earlier version of the sequential dataset into an adjacent, later version of the sequential dataset; and reverse patches between adjacent versions of the dataset in the patch chain, the patch chain spanning from the current version of the dataset to the first version of the dataset, each reverse patch comprising information for performing operations to modify a later version of the sequential dataset into an adjacent, earlier version of the sequential dataset;

a portion configured for receiving new content for the sequential dataset;

a portion configured for building a new current version of the sequential dataset that comprises the new content;

a portion configured for building at least one specific patch from a group of specific patches consisting of:

a specific forward patch from the adjacent, previous version of the dataset to the new current version of sequential dataset, the specific forward patch comprising information for performing operations to modify the adjacent, previous version of the sequential dataset into the new current version of the sequential dataset; and a specific reverse patch from the new current version of the sequential dataset to an adjacent, previous version of the dataset, the specific reverse patch comprising information for performing operations to modify the new current version of the sequential dataset into the adjacent, previous version of the sequential dataset;

a portion configured for storing the at least one specific built patch in the patch chain; and a portion configured for receiving, by the at least one computer, a request from a specific client to associate a provided name with a specific version of the sequential dataset;

a portion configured for, responsive to the received request, associating, by the at least one computer, the received name with the specific version of the dataset for the specific client, thereby naming the specific version of the sequential dataset according to the client request.

18. The computer system of claim 17 further comprising:

a portion configured for receiving a request from a client for an update to the current version of the sequential dataset, the request identifying a client version of the sequential dataset;

a portion configured for merging multiple patches of the patch chain from the client version of the sequential dataset to the current version of the sequential data set, said merging of patches creating a single direct delta, the direct delta comprising all operations for updating the client version of the sequential dataset to the current version of the sequential data set; and a portion configured for transmitting the direct delta to the client.

* * * * *